June 30, 1970   J. C. JIMERSON ET AL   3,518,500

FLAT PLATE FEED-THROUGH CAPACITOR

Filed March 6, 1968                                2 Sheets-Sheet 1

INVENTORS
JAMES C. JIMERSON
JOHN B. GRESKAMP
DANIEL J. ANDERSON

BY Charles W Hoffmann
ATTORNEY

INVENTORS
JAMES C. JIMERSON
JOHN B GRESKAMP
DANIEL J. ANDERSON

Charles W. Hoffmann
ATTORNEY

United States Patent Office 3,518,500
Patented June 30, 1970

3,518,500
FLAT PLATE FEED-THROUGH CAPACITOR
James C. Jimerson, 1820 Fairhaven Drive 46229; John B. Greskamp, 5010 Glen Mar Lane 46226; and Daniel J. Anderson, 7412 Graham Road 46250, all of Indianapolis, Ind.
Filed Mar. 6, 1968, Ser. No. 710,919
Int. Cl. H01g 9/00, 3/07
U.S. Cl. 317—230                17 Claims

ABSTRACT OF THE DISCLOSURE

An electrolytic feed-through capacitance device including a plurality of stacked, film-forming metal electrodes. Alternate ones of the electrodes form the anode of the capacitance device and include at least one input tab and at least one output tab. The remainder of said electrodes form the cathode of the capacitance device and include at least one input tab and at least one output tab. A dielectric film overlies the anode electrodes. An electrolyte contacts each of the electrodes.

---

The present invention relates to an electrolytic capacitor, more particularly, to a feed-through electrolytic capacitor and the method of making the same.

Feed-through capacitors are commonly employed as filter-type connecting elements for filtering out unwanted high frequency components which may be present in an electrical signal.

Generally, the feed-through capacitor is an integral part of the metal chassis through which it projects, simplifying grounding problems at radio frequencies. Lead inductance of the feed-through capacitor is substantially reduced because the physical size is small and the inductance is in series with the inner electrodes. The high frequency signals causing interference are bypassed to ground through the dielectric of a feed-through capacitor, and the desired signal is allowed to pass through the conducting portion of the capacitor. The above is usually accomplished by connecting one electrode of the capacitor to a transmission line, and connecting the opposite electrode to ground. Thus, the feed-through capacitor is a filter that is a part of the transmission line.

Several of the presently available feed-through capacitors include a centrally located wire-like conductor substantially surrounded by a tube-like mass of suitable dielectric material positioned intermediate the ends of the wire-like conductor. An outer conductive layer is disposed in overlying relationship on the dielectric layer.

The present invention contemplates an electrolytic feed-through capacitance device including a plurality of stacked, substantially flat metal electrodes having improved electrical characteristics. In particular, the equivalent series resistance of the feed-through capacitor above about 1 kilocycle is substantially less than the equivalent series resistance of the same capacitor below about 1 kilocycle. A conventional computer grade capacitor, that is, a convolutely wound aluminum electrolytic capacitor, has its equivalent series resistance decreasing slowly as the frequency to which the capacitor is subjected increases. The impedance of the feed-through capacitor of the present invention at about 500 kilocycles is several magnitudes less than that of the conventional computer grade capacitor thereby significantly reducing power dissipation and significantly reducing the time required to charge and discharge the capacitor of the present invention. The capacitor of the present invention is suitable for use with high speed circuits, that is, circuits requiring very short time constants such as computer circuits. The feed-through capacitor may be an integral part of a transmission line. In addition, the feed-through capacitor has high current carrying capabilities.

Accordingly, it is an object of the present invention to provide a feed-through capacitor having a plurality of stacked plates.

A further object of the present invention is to provide a feed-through capacitor exhibiting reduced equivalent series resistance at high frequencies.

Another object of the present invention is to provide a stacked plate feed-through capacitor having an input and an output terminal connected to each of the stacked plates.

Yet another object of the present invention is to provide a stacked plate feed-through capacitor which may be manufactured relativley easily and inexpensively.

A further object of the invention is to provide an improved feed-through capacitor and method of manufacturing the same.

Another object of the present invention is to provide a feed-through capacitor exhibiting substantially reduced power dissipation.

Yet another object of the invention is to provide a wet electrolyte capacitor having a plurality of stacked plates which is a feed-through capacitor.

Another object of the present invention is to provide a feed-through capacitor wherein the stacked plates are fabricated from a film-forming metal.

A further object of the present invention is to provide a feed-through capacitance device including a plurality of substantially flat stacked pates, the device exhibiting low inductance and thus being suitable for use in high speed circuits.

Another object of the present invention is to provide a flat feed-through capacitance device using an electrolyte with a resistance of about 500 ohm-cm.$^{-1}$ or less and aluminum foil plates stacked in succession.

Still another object of the present invention is to provide a feed-through capacitance device wherein each plate has a multi-tab output and a single-tab input.

A further object of the present invention is to provide an electrolytic capacitance feed-through device wherein current is substantially continuously flowing through the anode and cathode plates during operation of the feed-through capacitance device.

Wtih the aforementioned objects enumerated, other objects will be apparent to those possessing ordinary skill in the art. Other objects will be apparent from the following description, appended claims and apended drawings.

The appended drawings illustrate the present invention in an advantageous mode devised for the practical application of the basic principles involved in the hereinafter described invention.

Generally speaking, the present invention relates to a feed-through capacitance device having stacked flat plates wherein successive ones of the plates form the anode of the capacitor device and wherein the remaining plates form the cathode of the capacitor. Each of the anode plates and each of the cathode plates include at least one input tab and at least one output tab thereby forming a stacked, flat plate feed-through capacitance device.

Figure 1:
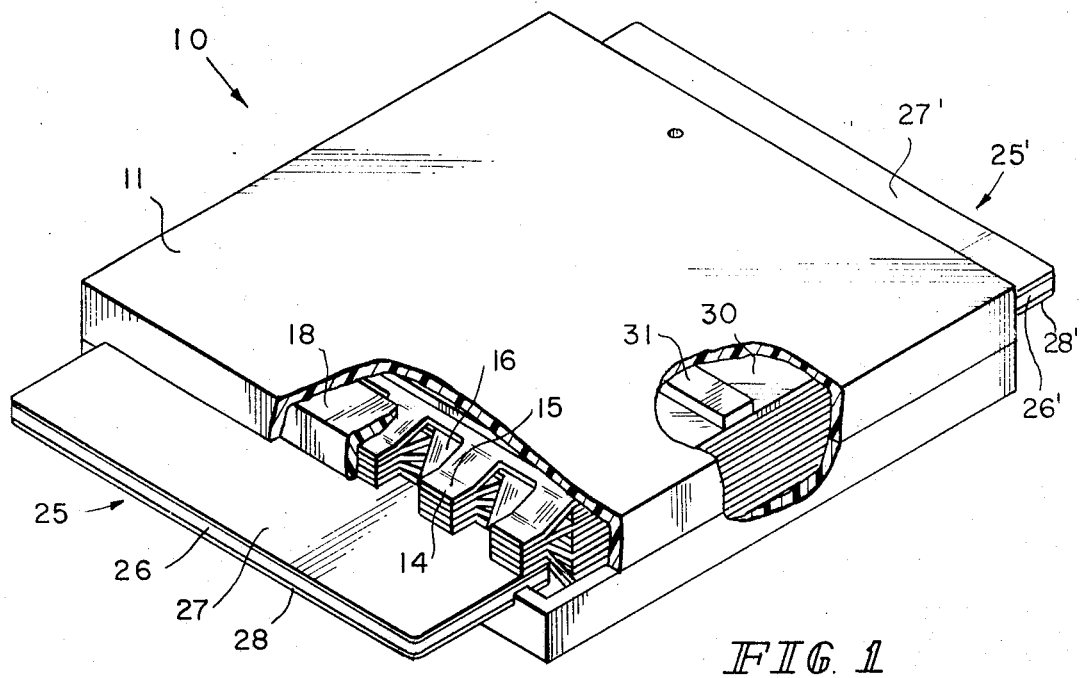
FIG. 1 is a perspective view of the feed-through capacitor selected areas thereof removed to illustrate the terminations of the stacked capacitor plates and the pressure means used to apply substantially uniform pressure over the plates.
Figure 2:
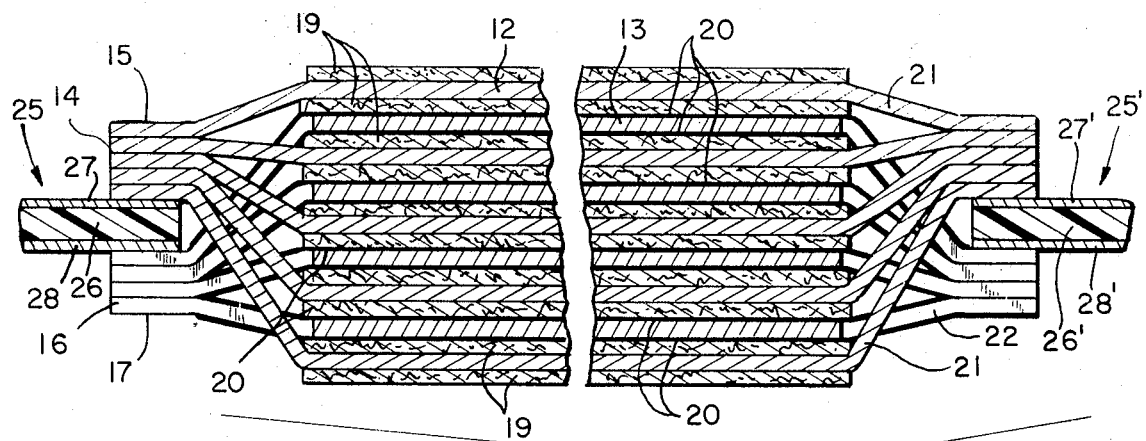
FIG. 2 is a disproportionate sectional view of the feed-through capacitor device further illustrating the stacked plates of the capacitor device.

Referring now to FIGS. 1 and 2 of the drawing, there is illustrated a feed-through capacitor 10 which, in accordance with the invention is capable of being used with high speed circuits such as those employed by computers and the like. The capacitor includes a substantially rectangular-shaped housing 11 of a pre-molded insulative material that has a high dielectric strength, that is substantially non-inductive, is able to withstand reasonably high temperatures and has reasonable mechanical strength. The housing may be formed from complementary housing halves. Resilient or elastomeric materials may be used to form the housing. Materials such as epoxy, polycarbonate, phenolic, silicon rubber and nylon are satisfactory with phenolic being the preferred material for the pre-molded housing.

A plurality of stacked substantially flat plates 12 and 13 are alternately arranged. The plates may be fabricated from any film-forming metal such as aluminum, tantalum, titanium, niobium, hafnium, zirconium and the like. Of the several film-forming metals, aluminum is preferred since aluminum is generally deep etched more easily and conveniently than most film-forming metals thereby significantly increasing the effective surface area of the aluminum. Since capacitance is proportional to effective anode area, etching results in a capacitor having many times more the capacitance than a unit with unetched anode plates of the same physical size. The aluminum foil may be etched in a bath containing a suitable etching solution such as sodium chloride, sodium hydroxide and the like using standard etching procedures. The thickness of the film-forming metal foil may vary from about 0.0005 to about 0.010 inch. It is preferred, however, that about 0.002 to about 0.005 inch thick aluminum foil be used. 0.0035 inch thick aluminum foil is most preferred. It is thought that the aluminum foil anode and cathode plates used in the feed-through capacitor device should be severed from strip aluminum foil, etched or unetched, having a thickness of about 0.0035 inch. The individual plate preferably should be severed from the foil so as to substantially retain flat surfaces without edge burrs, wrinkles or distortion. If the surface or edges or both of the plates are distorted, burred or wrinkled, the electrical characteristics of the capacitor device may be harmfully effected.

The plates 13, used as the anode plates, are anodized in a suitable anodizing bath such as a concentrated solution of phosphoric acid, boric acid, ammonium pentaborate or mixtures thereof. Anodizing the plates causes a suitable dielectric film 20 to be formed on the plates. The cathode plates, in addition to the anode plates, may be anodized so as to provide a non-polar capacitor, however, the capacitance of a stack plate feed-through non-polar capacitor is usually less than that of the polar capacitor device where only the anode plates are anodized.

Plates 12 are of one polarity and plates 13 are of the opposite polarity. For example, if alternate plates 13 form the anode or positive plate of the feed-through device, the remaining alternate plates 12 are the cathode or negative element of the feed-through device. Note that there is one more cathode plate than anode plate so that a cathode plate is the outermost plate on either side of the capacitor device. With the cathode plate as the outermost plate of the capacitor, the device more effectively utilizes its potential capacitance and the outside cathode plate inductively shields the device.

The anode plates are connected to an external termination means 25 through a plurality of transversely spaced terminal tabs 14 which may be suitably bonded together by such means as by welding as at 15 shown in FIG. 2. Welding may be accomplished by ultrasonic welding, laser welding, electron beam welding and the like. The weld so produced is a low resistance weld. It should be seen that each plate includes a plurality of integral, transversely spaced output terminal tabs 14. The spacing between each output termination tab is slightly more than the width of the terminal tab. The remaining plates, that is, the cathode plates 12, are each provided with a plurality of integral, transversely spaced terminal tabs 16 which may be suitably welded together as shown at 17 of FIG. 2. It should be noted that the spacing between each terminal tab is slightly more than the width of the tab. The terminal tabs 14 and the terminal tabs 16 are so positioned that when each is slightly bent so as to contact the external terminal means 25, the tabs 14 pass through the space between adjacent tabs 16 and the tabs 16 pass through the spacing between adjacent tabs 14.

Figure 3:
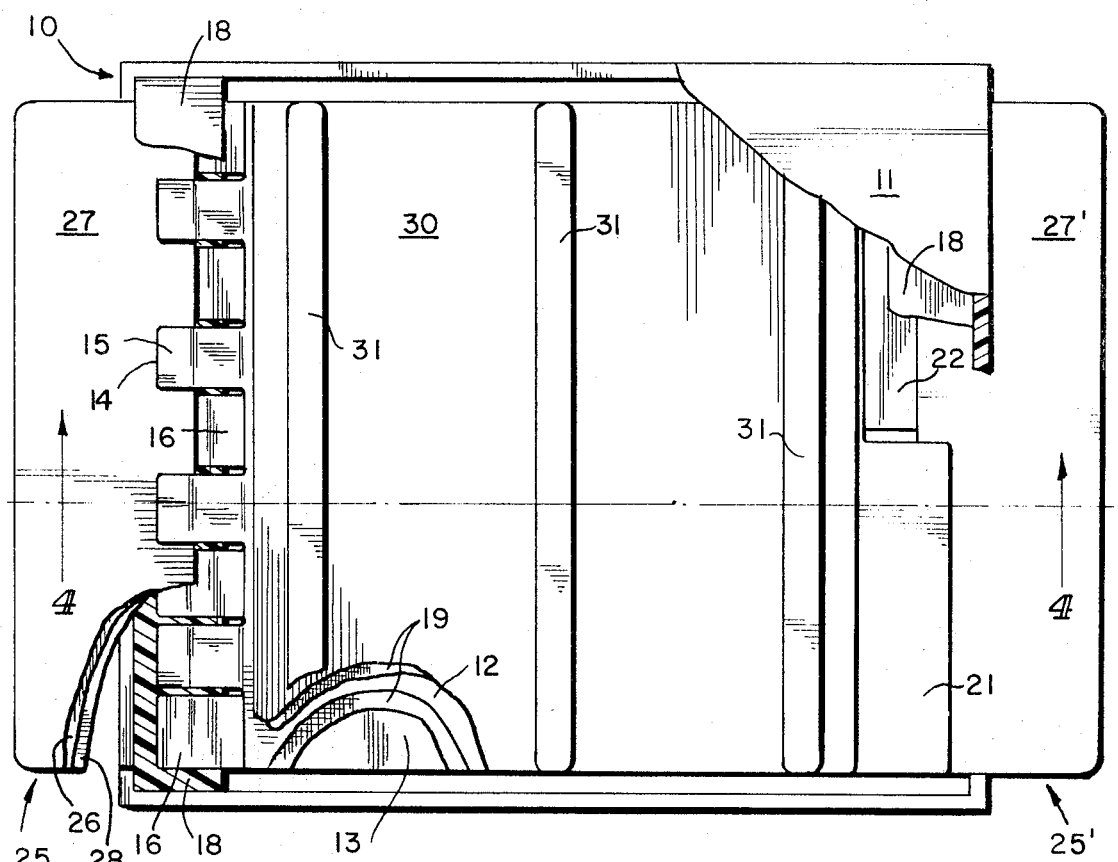
FIG. 3 is a top view of the feed-through capacitor with selected portions thereof removed.

The input tab 21 of each cathode plate and the input tab 22 of each anode plate extend slightly less then halfway across their associated plate and are integral therewith. As is shown in FIG. 3 of the drawing, the cathode input tab of each cathode plate is integral with the half of the cathode plate nearest to the viewer while the anode input tab of each anode plate is integral with the anode plate furthest from the viewer. The location of the anode and cathode tabs with respect to the viewer may be reversed if desired. Each of the input tabs, whether anodic or cathodic, are slightly bent and welded to external terminal means 25'. The cathode input tabs are welded at 23 and the anode input tabs are welded at 25 by ultrasonic welding, laser welding, electron beam welding and the like so as to produce a low resistance weld.

The individual plates of the feed-through device may have a multi-tab input and a single-tab output in lieu of the tab construction outlined above. However, the multi-tab input, single-tab output feed-through device has a reduced filtering effect on the input signal, but, the feed-through device has characteristics more similar to those of the ideal capacitor. The single-tab output feed-through device also has an increased inductance output when compared to the inductance output of the multi-tab output feed-through device. It should be seen, therefore, that the feed-through capacitor having stacked plates with a single-tab input and multi-tab output is preferred for computer circuitry applications.

External connection is made to the anode and to the cathode plates as indicated in the figures. FIGS. 1 and 2 perhaps more clearly shows the termination of the tabs involved. A laminated rectangular-shaped means 25 provides the termination for the multi-tab output of the anode and cathode plates whereas the rectangular means 25' provides termination for the single-tab input of the capacitor device. It should be noted that the width of each of the rectangular means is substantially the same as the width of the anode and the cathode plates. Each of the rectangular-shaped laminated means includes an insulative material 26 disposed between the conductive members 27 and 28, so as to electrically insulate each of the members from one another. The insulative material may be any suitable material of the type generally used to fabricate printed circuit boards such as glass filled epoxy and the like. The conductive members 27 and 28 may be any suitable conductive material such as platinum, gold, silver, copper, aluminum and the like. The termination on the input side of the capacitor is similarly constructed, that is, insulative material 26' separates conductive members 27' and 28'. The construction of the input and the output terminations of the feed-through capacitor lend themselves to being inserted into a printed circuit board.

Figure 4:
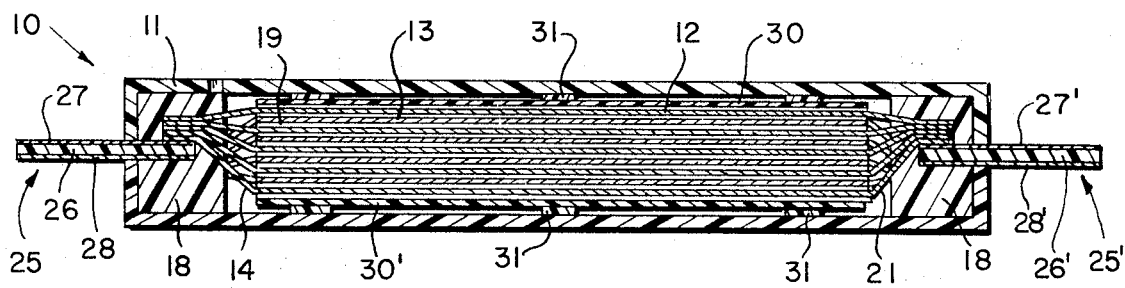
FIG. 4 is a cross-sectional view taken across lines 4—4 of FIG. 3.

Preferably the tabs 14 and 16 are substantially encased in a suitable resilient or elastomeric encasing means 18 as shown in FIG. 1, and more clearly shown in FIG. 4. The encasing means may be any suitable material such as epoxy polycarbonate, phenolic, silicon rubber, nylon and the like. The preferred material for the encasing means is silicone rubber. The encasing means serves several functions such as giving added strength to the weld joint, substantially preventing the electrolyte from creeping along the electrodes to the external termination means 25, and substantially preventing harmful random movement of the stacked plates with respect to the housing which may cause shearing of the tabs from the plates. The encasing means may or may not coalesce with the housing.

A pressure plate 30 overlies the uppermost cathode plate 12 and a pressure plate 30' underlies the lowermost cathode plate 12 of the feed-through capacitor device. A plurality of pressure means 31 extend widthwise across the pressure plates 30 and 30'. The pressure means may be an integral part of the housing or of the pressure plates or may be separate from both the housing and the pressure plates. As illustrated in FIG. 1, the pressure means are positioned between the inner surface of the casing and the pressure plate so as to exert a compressive force on the pressure plate. The dimensions of the pressure plate approximates the dimensions of the cooperating cathode plate except that the pressure plate does not extend over the tabs cooperatively associated with the cathode plate. The pressure plate uniformly distributes the compressive forces exerted by the pressure means. The pressure plate substantially prevents distortion of the anode and cathode plates compressed therebetween.

Each of the adjacent plates are separated by suitable cellulose, in fibrous form, separator means 19 such as manila paper, kraft paper and the like. The paper generally has a thickness of about 5 microns to about 10 mils with 0.5 to 1.0 mil being preferred. In order to minimize the possibility of an electrical short developing between adjacent plates, each paper separator is formed so as to have dimensions slightly larger than the dimensions of the foil plates thereby extending slightly beyond the edges of the adjacent foil plates.

In general, the electrolytes used in dry electrolytic capacitors, that is, most of the electrolyte is in the porous paper, are variations of the ammonium borate and boric acid with glycol. These electrolytes are satisfactory for their intended purpose, however, these electrolytes possess a high resistivity which precludes their use in the feed-through capacitor of the present invention. It is thought that a non-aqueous electrolyte having a low resistivity and low viscosity would be most advantageous. Therefore, the electrolyte employed in the feed-through capacitor should include the properties of low resistivity, that is, a resistance of about 500 ohm centimeters or less as well as a low viscosity. It is thought glycol-borate, with anhydrous ammonia or ammonium pentaborate non-aqueous solutions such as ethylene glycol monomethyl ether with maleic acid and diethylamine, or N,N-dimethyl formamide with boric acid, maleic acid, malonic acid and tributylamine aqueous solutions such as a saturated ammonium pentaborate, azeotropic solution such as acetic acid and triethylamine and gelled electrolytes with a gelling agent and any of the aforementioned electrolyte systems with a resistance less than 500 ohm centimeters would be satisfactory. Of the several electrolytes, ethylene glycol monomethyl ether with maleic acid and diethylamine is preferred. Most of the electrolyte is in the porous paper. When most of the electrolyte is in the paper, the capacitor is generally classified as a dry capacitor as distinguished from a wet capacitor wherein a metal cathode can is filled with an electrolyte.

The method of making several of the feed-through devices of the present invention will follow hereinafter. A series of plates are cut from a roll of etched aluminum foil having a thickness of about 0.0035 inch having integral multiple tab outputs and single tab inputs. The plates have the dimensions of about 3⅝" x 5". It should be recognized that the dimensions could be varied as desired such that enlarging the dimensions increases the capacitance and decreasing the dimensions decreases the capacitance. Of the several plates, a group of plates to be used as the anode plates are randomly selected and anodized in phosphoric acid at about 9 volts for about 5–15 minutes. The foil to be used as the anode or anodes may be anodized prior to severing the plates therefrom if desired. The oxide film formed on the aluminum plates is about 150 angstroms thick. A separator of manila paper having a thickness of about 1 mil is impreganted with a maleic acid, diethylamine, ethylene glycol monomethyl ether electrolyte. The impregnated paper is positioned between each individual plate of the capacitor device. The plates are longitudinally spaced so that there are 10 anode plates and about 11 cathode plates with the above separators. The number of anode and the number of cathode plates used are illustrative only and not limiting. The electrolyte in the first device was ethylene glycol monomethyl ether, maleic acid and diethylamine. The electrolyte in the second device was ethylene glycol monomethyl ether, maleic acid and diethylamine, and the electrolyte in the third device was saturated ammonium borate. The terminal weld in the first device is a resistance weld and in the latter two devices the weld is an ultrasonic weld. All three devices were sealed in a case which was composed of Plexiglas plates sealed with silicone rubber.

A comparison of a 25° C. equivalent series resistance and impedance values for a standard computer grade capacitor and the feed-through capacitor with 18,000–25,000 microfarads and 6–10 volts D.C. ratings are shown below in the following tables. The first three devices in each of the tables are computer grade capacitors whereas the last three devices in each of the tables are capacitors having the feed-through structure explained above.

TABLE I.—EQUIVALENT SERIES RESISTANCE (OHMS)

|   | 120 cycles | 1 kc. | 10 kc. | 20 kc. |
|---|---|---|---|---|
| 1 | .0130 | .0120 | .0110 | .0107 |
| 2 | .0130 | .0122 | .0112 | .0110 |
| 3 | .0140 | .0124 | .0114 | .0112 |
| 1 | .0050 | .0014 | .0010 | .0009 |
| 2 | .0045 | .0014 | .0010 | .0008 |
| 3 | .0041 | .0009 | .0005 | .0001 |

TABLE II.—IMPEDANCE (OHMS)

|   | 120 cycles | 1 kc. | 10 kc. | 100 kc. | 500 kc. | 1 mc. |
|---|---|---|---|---|---|---|
| 1 | .060 | .015 | .022 | .155 | 2.52 | 4.30 |
| 2 | .058 | .016 | .023 | .145 | 2.43 | 4.60 |
| 3 | .058 | .015 | .022 | .145 | 2.45 | 4.85 |
| 1 | .066 | .007 | .003 | .03 | .11 | .38 |
| 2 | .060 | .015 | .013 | .12 | .26 | .20 |
| 3 | .056 | .016 | .011 | .20 | .22 | .20 |

It should be seen from the above table that the impedance of stacked plate feed-through device above 500 kc. is many times lower than that of the conventional computer grade device. The equivalent series resistance of the stacked plate feed-through capacitor is substantially less than equivalent series resistance of the capacitor below 1 kilocycle. Such a construction has a low inductance characteristic. The reduced equivalent series resistance above 1 kilocycle, the reduced impedance of the feed-through device over the conventional computer grade capacitor at 500 kilocycles, the low inductance makes the present invention suitable for use in fast circuits, e.g. circuits of very short time duration.

While particular embodiments of the invention have been illustrated and described, numerous variations and modifications thereof may be made without departing from the scope of the present invention. Accordingly, it is intended by the appended claims to cover all such variations and modifications.

Having thus disclosed our invention, we claim:
1. A feed-through capacitance device comprising:
   a plurality of metal electrodes, alternate ones of said electrodes forming the anodes of said device, the remainder of said electrodes forming cathodes of said device;
   a dielectric between and in contact with said anodes and cathodes;
   a first unitary terminating means comprising an anode input terminal means and a cathode input terminal means and means electrically insulating said anode input terminal means from said cathode input terminal means;

a plurality of anode input tabs, each in electrical contact with said anode input terminal means and with at least one of said anodes;

a plurality of cathode input tabs each in electrical contact with said cathode input terminal means and with at least one of said cathodes;

a second unitary terminating means comprising an anode output terminal means and a cathode output terminal means and means electrically insulating said anode output terminal means from said cathode output terminal means;

a plurality of anode output tabs, each in electrical contact with said anode output terminal means and with at least one of said anodes;

a plurality of cathode output tabs, each in electrical contact with said cathode output terminal means and with at least one of said cathodes.

2. The feed-through device of claim 1, wherein said electrodes are substantially flat, stacked plate electrodes.

3. The feed-through device of claim 1, further including pressure means for exerting a compression force on said cathode and anode plate electrodes.

4. The feed-through device of claim 1, wherein said input anode and said input cathode tabs are each single tabs and wherein said output anode and said output cathode tabes each have multiple tabs.

5. The feed-through device of claim 4, wherein said multiple output anode tabs are separated from adjacent anode tabs by a distance slightly more than the width of said adjacent anode tabs and wherein said multiple output cathode tabs are separated from adjacent cathode tabs by a distance slightly more than the width of said adjacent cathode tabs, said anode tabs are bent so as to project through the area between adjacent cathode tabs, and said cathode tabs are bent so as to project through the area between adjacent anode tabs.

6. The feed-through capacitance device of claim 1, wherein all of said input tabs of said anode are connected together, all of said input tabs of said cathode are connected together, all of said output tabs of said anode are connected together, and all of said output tabs of said cathode are connected together.

7. The feed-through device of claim 1, wherein said insulating means is a laminated means, said anode tabs connected to one of said conductive elements and said cathode tabs connected to another of said conductive elements.

8. The feed-through device of claim 7, wherein each of said electrodes in film-forming metal selected from the group consisting of aluminum, tantalum, niobium, hafnium, titanium and zirconium.

9. The feed-through device of claim 8, wherein said electrodes have a thickness of about 0.0005 to about 0.010 inch.

10. The feed-through device of claim 9, wherein said anode electrodes have an oxide film thereon.

11. The feed-through device of claim 10, wherein said cathode electrodes have an oxide film thereon.

12. A method of making a feed-through capacitor comprising:

placing a capacitor electrolyte between and in contact with a plurality of anodes and cathodes with each of said anodes having a dielectric oxide thereon and with said anodes and cathodes each having at least one input tab and at least one output tab; electrically connecting each of said cathode input tabs to a single cathode terminal of an input unitary terminating means having at least one anode terminal and at least one cathode terminal;

electrically connecting each of said anode input tabs to said anode terminal of said input unitary terminating means, said anode terminal of the input terminating means being insulated from said cathode terminal after said connections thereof are made;

electrically connecting each of said anode output tabs to a single anode terminal of an output unitary terminating means having at least one anode terminal and at least one cathode terminal;

electrically conecting each of said cathode output tabs to said cathode terminal of said output unitary terminating means, said cathode terminal of the output terminating means being insulated from said anode terminal after said connections thereof are made.

13. A method according to claim 12 in which each of said anodes has a plurality of anode output tabs and said tabs are welded to said anode terminal of said output unitary terminating means.

14. A method according to claim 13 in which each of said cathodes has a plurality of cathode output tabs and said cathode output tabs are welded to said cathode terminal of said output unitary terminating means.

15. A method according to claim 12 in which each of said anodes has a plurality of anode input tabs and said anode input tabs are welded to said anode terminal of said input unitary terminating means.

16. A method according to claim 15 in which each of said cathodes has a plurality of cathode input tabs and said cathode input tabs are welded to said cathode terminal of said input unitary terminating means.

17. A method according to claim 12 in which said feed-through capacitor is encased with a thermoplastic material.

References Cited

UNITED STATES PATENTS

| | | | |
|---|---|---|---|
| 2,537,959 | 1/1951 | Beverly | 317—260 |
| 2,878,433 | 3/1959 | Beresford | 317—261 |
| 3,024,394 | 3/1962 | Salisbury | 317—261 |
| 3,308,359 | 3/1967 | Hayworth et al. | 317—260 |
| 3,439,230 | 4/1969 | Lambert et al. | 317—230 |

JAMES D. KALLAM, Primary Examiner

U.S. Cl. X.R.

29—570; 317—261